United States Patent Office 3,784,604
Patented Jan. 8, 1974

---

3,784,604
1-p-(ω - AMINOALKOXY)PHENYL - 4,4 - DIARYL-CYCLOHEXANES, CYCLOHEXENES AND CYCLOHEXANDIENES AND THE SALTS AND N-OXIDES THEREOF
Mario G. Buzzolini, Morristown, N.J., assignor to Sandoz, Inc., Hanover, N.J.
No Drawing. Filed Mar. 12, 1969, Ser. No. 806,680
Int. Cl. C07c 93/06; C07d 27/00
U.S. Cl. 260—570 R         12 Claims

ABSTRACT OF THE DISCLOSURE

This invention relates to 1-p-(ω-aminoalkoxy)phenyl-4,4-diarylcyclohexanes and cyclohexenes. The cyclohexanes are prepared by catalytic hydrogenation of either the cyclohexenes or cyclohexan-dienes while the cyclohexenes are prepared by dehydration of a corresponding cyclohexan-1-ol and the cyclohexan-dienes are prepared by dehydration of a corresponding 2-cyclohexen-1-ol, a representative compound being 1-[4-(2-diethylamino-ethoxy)phenyl]-4,4-diphenyl-cyclohexane hydrochloride. The invention also relates to intermediates and methods useful in the preparation thereof and to pharmaceutical compositions and methods utilizing said compounds.

---

In accordance with one aspect of the present invention there is provided cyclohexane derivatives from the group of:

(A) compounds of the following Formula I:

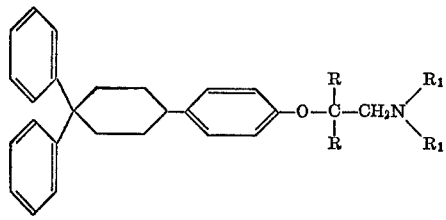

(I)

wherein
each of R is, independently, hydrogen or lower alkyl of 1 to 4 carbon atoms, e.g., methyl; and
each of $R_1$ is, independently, lower alkyl of 1 to 4 carbon atoms, e.g., methyl and ethyl, or both $R_1$ together form an alkylene bridge of 4 to 5 carbon atoms, e.g., both $R_2$ together with the amino nitrogen form a N-pyrrolidyl substituent;
(B) an N-oxide of said compounds; and
(C) the pharmaceutically acceptable acid addition salts of (A) and (B), above.

In accordance with another aspect of the invention, there is provided cyclohexene derivatives from the group of:

(D) compounds of the following Formula I-A:

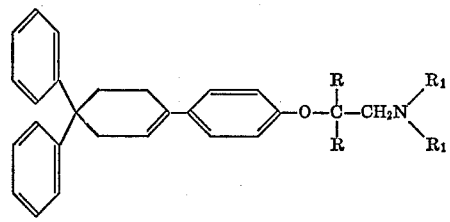

(IA)

wherein R and $R_1$ are as above defined;
(E) an N-oxide of said compounds of Formula I-A; and
(F) the pharmaceutically acceptable acid addition salts of (D) and (E), above.

In accordance with a further aspect of the invention, there is provided cyclohexan-dienes from the group of:

(G) Compounds of the Formula I-B:

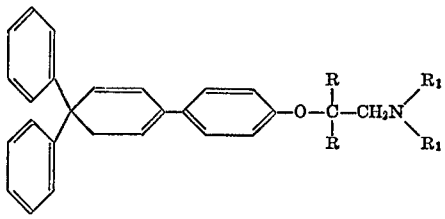

(IB)

wherein R and $R_1$ are as above defined;
(H) an N-oxide of said compounds of Formula I-B; and
(J) the pharmaceutically acceptable acid addition salts of (G) and (H) above.

The compounds of Formula I are prepared by catalytic hydrogenation of the corresponding compound of Formula I-A or of Formula I-B or by catalytic hydrogenation of a corresponding cyclohexan-1-ol of the Formula II-A or of a corresponding cyclohexen-1-ol of the Formula II-B, as follows:

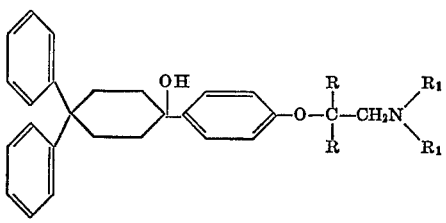

(IIA)

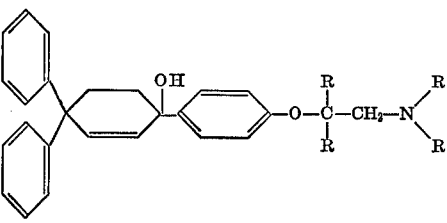

(IIB)

wherein R and $R_1$ are as defined.

The compounds of Formula I-A are readily prepared by dehydration of a corresponding compound of Formula II-A. Similarly, the compounds of Formula II-B.

The preparation of compounds I from a compound of Formula I-A, I-B, II-A or II-B involves a catalytic hydrogenation which may be carried out over a fairly wide temperature range typically from 10° C. to 100° C., preferably between 20° C. to 80° C. The hydrogenation may be carried out at atmospheric pressure or at superatmospheric pressure, and usually in the range between atmospheric pressure up to 2000 p.s.i. The hydrogenation is conducted preferably with an approximately required stoichiometric amount of elemental hydrogen and in the presence of inert organic solvent and hydrogenation catalyst of which several are known and available, such as platinum supported on carbon or palladium on carbon. The especially preferred catalyst is palladium supported on carbon, e.g., a catalyst of a minor portion of 3–10% palladium on 90–97% charcoal. Such charcoal supported palladium catalysts are of a well-known type. The especially preferred solvent for use with palladium-carbon catalyst is acetic acid. Compounds I are conveniently recovered in the form of an acid addition salt, preferably the hydrochloride, and, if desired, may be converted to the free base by conventional procedures.

The preparation of Compounds I-A and I-B from the Compounds II-A or II-B respectively may be carried out by subjecting a Compound II-A or II-B to dehydration in a known manner such as by contacting a Compound II-A or II-B with a strong inorganic acid such as hydrochloric acid. The compounds of Formula I-A and I-B may be isolated from the dehydration reaction by working up by conventional procedures.

The preparation of the N-oxide of the compounds of Formulae I, I-A and I-B may be carried out by the established peroxide procedures, for example, by reaction of a Compound I, I-A or I-B, respectively, with peracid, e.g., perbenzoic acid, m-chloroperbenzoic acid or peracetic acid with or without a solvent, e.g., chloroform, as may be desired or required depending respectively, upon the selection of liquid or solid oxidizing agents, at temperatures between room temperature up to about 90° C. The production of N-oxides is preferably carried out with a peroxide by established procedures, for example, by reaction of a Compound I, I-A or I-B with hydrogen peroxide in a suitable solvent at temperatures between room temperature up to about 90° C. Examples of preferred organic solvents typically employed include ethanol, acetic acid and acetic anhydride. The N-oxide may be isolated from the reaction mixture by working up by established procedures.

The compounds of Formula II-A are novel compounds also provided by the invention and are preferably prepared by reacting a 4,4-diarylcyclohexanone of Formula III-A:

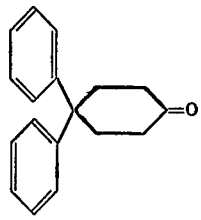

(IIIA)

with a Grignard compound of Formula IV:

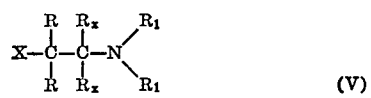

(IV)

wherein R and $R_1$ are as defined and X is halo of atomic weight of from 35 to 127, followed by hydrolysis in a known manner to obtain said compounds of Formula II-A.

The compounds II-B are also novel compounds provided by the invention and are preferably prepared analogously to those of compounds II-A by reacting a 4,4-diaryl-2-cyclohexenone of Formula III-B:

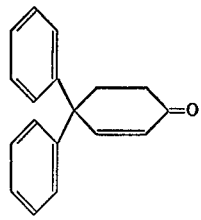

(IIIB)

with the Grignard Compound IV, followed by hydrolysis in a known manner to obtain said compounds of Formula II-B.

As illustrated above, Compounds II-A and II-B are preferably produced by the reaction of a Compound III-A or III-B, respectively, with an appropriate Grignard Compound IV. The reaction of a Compound III-A or III-B with the Grignard Compound IV to produce Compounds II-A and II-B, respectively, is carried out in a conventional manner in the presence of an inert organic solvent and preferably at temperatures between about −10° C. to +80° C., followed by hydrolysis in the conventional manner, i.e., in a neutral medium such as water or saturated ammonium chloride solution. Preferred solvents are those customarily employed in Grignard reactions, including, by way of illustration, tetrahydrofuran, dioxane and other ethers such as diethyl ether, more preferably tetrahydrofuran. The Compounds II-A and II-B may be isolated from the reaction mixture by working up by established procedures.

The Compounds III-A, III-B and IV employed as starting material in preparation of Compounds II-A and II-B are either known or can be prepared from known materials by established procedures. The Grignard compounds of Formula IV are thus conveniently prepared by reaction of magnesium with the corresponding 4-halo-1-aminoalkoxybenzene and the latter compounds conveniently prepared by reaction of a p-halophenol with the alpha halo derivative of or forming the desired ω-aminoalkoxy moiety and having the following Formula V:

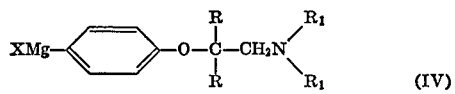

(V)

wherein R, $R_1$ and X are as defined, and both $R_x$ are both hydrogen or lower alkyl but when lower alkyl both R are hydrogen.

It will thus be evident that the reaction of the appropriate p-halophenol starting material with a Compound V involves a synthesis of the known Williamson type. The Compounds IV in which R is lower alkyl are desirably prepared from Compounds V in which $R_x$ is lower alkyl because such Compounds V readily undergo rearrangement on reaction with phenol starting material (phenolate) to form Compounds IV in which the alpha carbon substituent R is lower alkyl, as described by J. F. Kerswin et al., J.A.C.S. 69, 2961 (1947).

Also within the scope of the present invention are pharmaceutically acceptable salts not materially affecting the pharmacological effect of the compounds of the invention. Such salts include the acid addition salts, e.g., the hydrochloride, fumarate, formate, citrate, sulfonate, malonate, tartrate, methane sulfonate, salicylate and hydrosulfate. The acid addition salts may be produced as desired from the corresponding free bases by conventional procedures. Conversely, the free bases may be obtained from the salts by procedures known in the art.

The compounds of structural Formulae I, I-A, and I-B and their N-oxides and pharmaceutically acceptable acid addition salts are useful because they possess pharmacological activity in animals. In particular, the compounds are useful as hypolipidemic agents, as evidenced, for example, by having hypocholesteremic and hypotriglyceridemic activity, as indicated by tests on a group of white rats which are given typically 10–50 milligrams per kilogram of body weight per diem of the compound orally, for 6 days, followed by extraction with isopropanol of serum or plasma after anesthetizing the rats with sodium hexobarbital, and then noting the cholesterol and triglyceride contents as compared to those of a control group. The cholesterol and triglyceride contents are determined by the methods described by Lofland, H. B., Anal. Biochem. 9:393 (1964): (Technicon method N 24a): and Kessler, G., and Lederer, H., Technicon Symposium, Mediad Inc., New York, pp. 345–347, (1965), respectively. For such usage, the compounds may be administered orally as such or admixed with conventional pharmaceutical carriers. The dosage administered may vary depending on the particular compound employed, the therapy desired and the severity of the condition being treated. In general, satisfactory results are obtained when administered at a daily dosage of from about 4 milligrams to about 30 milligrams per kilogram of animal body weight, preferably given in divided doses, 2 to 4 times a day, or in sustained release form. For most mammals the total daily dosage is from about 50 milligrams to about 500 milligrams of the compound and the dosage forms suitable for internal use comprise from about 12.5 milligrams to about 250 milligrams of active compound in intimate admixture with a solid or liquid pharmaceutically acceptable carrier or diluent.

For above usages, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegent and palatable perparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin, and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The preferred pharmaceutical compositions from the standpoint of preparation and ease of administration are solid compositions, particularly hard-filled capsules and tablets.

A representative formulation is a tablet prepared by conventional tabletting techniques and containing the following ingredients:

| Ingredient: | Weight (mg.) |
| --- | --- |
| 1-[4-(1,1 - dimethyl-2-dimethylaminoethoxy) phenyl]-4,4-diphenyl - cyclohexane hydrochloride | 50 |
| Tragacanth | 10 |
| Lactose | 197.5 |
| Corn starch | 25 |
| Talcum | 15 |
| Magnesium stearate | 2.5 |

The following examples show representative compounds encompassed within the scope of this invention and the manner in which such compounds are prepared. However, it is to be understood that the examples are for purposes of illustration only.

EXAMPLE 1

1-[4-(2-diethylaminoethoxy)phenyl]-4,4-diphenyl-cyclohexane hydrochloride

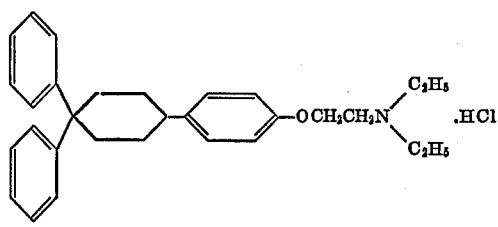

Step A: Preparation of 1-[4-(2-diethylaminoethoxy)phenyl]-4,4-diphenyl-cyclohexan-1-ol.—A solution of 5.16 g. of p-bromo-diethylaminoethoxybenzene in 20 ml. tetrahydrofuran is added dropwise to 0.480 g. of magnesium turnings in 10 ml. of refluxing tetrahydrofuran. The reaction is carried out under dry nitrogen. After the addition is completed the resulting mixture is gently refluxed for an additional hour. A solution of 4 g. of 4,4-diphenyl-cyclohexanone in 40 ml. of tetrahydrofuran is then added dropwise at room temperature and the reaction mixture is then kept at reflux temperature for 4 hours, stirred overnight at room temperature and finally hydrolyzed with a saturated ammonium chloride solution. The resulting alkaline mixture is extracted twice with diethyl ether, the combined ether layers washed neutral with water and dried over magnesium sulphate. The drying agent is removed by filtration and the solvent removed by gentle warming under reduced pressure (water pump). The excess hydrolyzed reagent is separated by distillation in the high vacuum at 80–90° C. to obtain an oil of 1-[4-(2-diethylaminoethoxy)phenyl]-4,4-diphenyl - cyclohexan-1-ol.

Step B: Preparation of 1-[4-(2-diethylaminoethoxy) phenyl]-4,4-diphenyl-1-cyclohexane hydrochloride.—The oil obtained in Step A, above, is dissolved in 40 ml. of diethyl ether and treated with an excess of a saturated solution of hydrogen chloride in diethyl ether. The solvent is decanted and the resulting white solid triturated several times with diethyl ether. The crude hydrochloride is recrystallized twice from a 1:1 mixture of isopropanol and ethanol yielding white crystals of 1-[4-(2-diethylaminoethoxy)phenyl] - 4,4 - diphenyl-1-cyclohexane hydrochloride, M.P. 211.5–213° C.

Step C: Preparation of 1-[4-(2-diethylaminoethoxy) phenyl]-4,4-diphenyl-cyclohexene hydrochloride.—A solution of 0.350 g. of the product of Step B, above, in 30 ml. of glacial acetic acid is hydrogenated at atmospheric pressure over 0.350 g. of 10% palladium on charcoal. The catalyst is separated by filtration and the solvent evaporated under reduced pressure. The residue is taken up in water, made alkaline with 2 N sodium hydroxide and extracted with ether. The ethereal layer is washed neutral with water, dried over magnesium sulphate and concentrated under reduced pressure. The resulting crude oil is dissolved in 20 ml. diethyl ether and treated with an excess of a saturated solution of hydrogen chloride in ether. The solvent is decanted and the resulting white solid triturated several times with ether. The crude hydrochloride is recrystallized from a 1:1 mixture of ethanol and isopropanol to obtain white crystals of 1-[4-(2-diethylaminoethoxy)phenyl] - 4,4 - diphenyl-1-cyclohexane hydrochloride, M.P. 213.5–214.5° C.

EXAMPLE 2

Following the procedure of Example 1 and employing the appropriate corresponding starting materials in appropriate equivalent proportions, the following compounds are prepared in sequence:

(A) 1-[4-(1,1-dimethyl - 2 - dimethylaminoethoxy) phenyl] - 4,4 - diphenylcyclohexan-1-ol hydrochloride, M.P. 144.5-145° C. (crystallization from methylene chloride/petroleum ether (ca. 1:1)).

(B) 1-[4-(1,1 - dimethyl - 2 - dimethylaminoethoxy)phenyl] - 4,4 - diphenyl-1-cyclohexene hydrochloride.

(C) 1-[4-(1,1 - dimethyl - 2 - dimethylaminoethoxy)phenyl]-4,4-diphenylcyclohexane hydrochloride.

What is claimed is:

1. A compound selected from the group consisting of
(A) a compound of the Formulae I, I–A or I–B as follows:

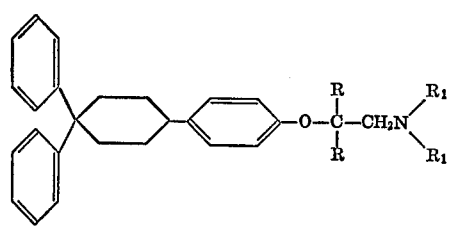

(I)

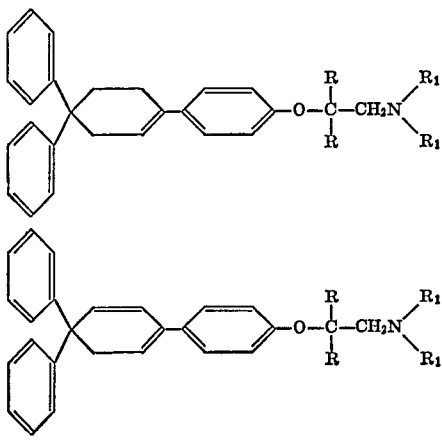

wherein
- each of R is, independently, hydrogen or lower alkyl;
- each of $R_1$ is, independently, lower alkyl;

(B) an N-oxide of said compounds in (A), above, and
(C) the pharmaceutically acceptable acid addition salts of (A) and (B), above.

2. A compound of claim 1 having the Formula I:

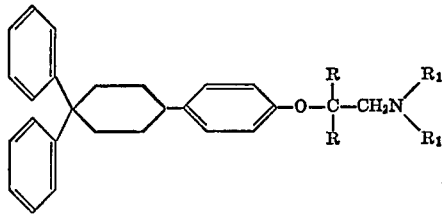

wherein R and $R_1$ are as defined in claim 1.

3. A compound of claim 2 in which $R_1$ and each R are independently lower alkyl.

4. The compound of claim 3 which is 1-[4-(1,1-dimethyl-2-dimethylaminoethoxy)phenyl] - 4,4 - diphenyl-cyclohexane.

5. The compound of claim 2 which is 1-[4-(2-diethylaminoethoxy)phenyl]-4,4-diphenyl-cyclohexane.

6. A compound of claim 1 having the Formula IA:

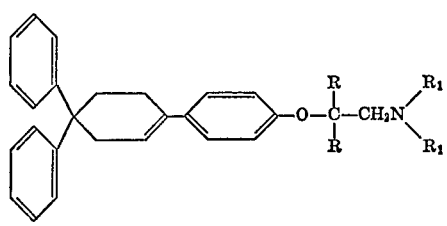

wherein R and $R_1$ are as defined in claim 1.

7. A compound of claim 6 in which each R is a lower alkyl and each $R_1$ is a lower alkyl.

8. A compound of claim 1 having the Formula I-B:

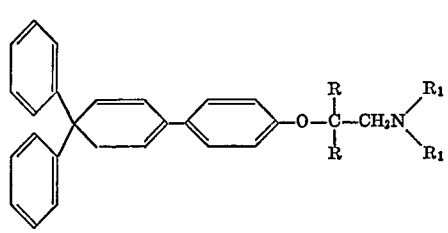

wherein R and $R_1$ are as defined in claim 1.

9. A compound selected from the group consisting of compounds of the Formula II-A and II-B:

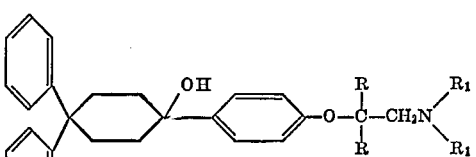

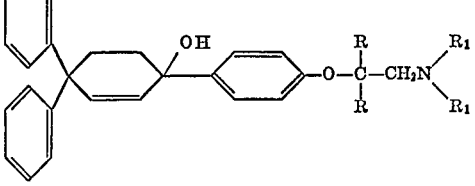

wherein
- each of R is, independently, hydrogen or lower alkyl;
- each of $R_1$ is, independently, lower alkyl.

10. A compound of claim 9 having the Formula II-A:

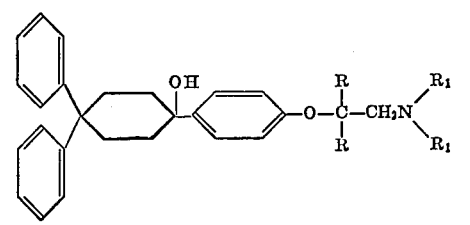

wherein R and $R_1$ are as defined in claim 9.

11. The compound of claim 7 which is 1-[4-(1,1-dimethyl - 2 - dimethylaminoethoxy)phenyl]-4,4-diphenyl-1-cyclohexene hydrochloride.

12. The compound of claim 6 which is 1-[4-(2-diethylaminoethoxy)phenyl]-4,4-diphenyl-cyclohexene hydrochloride.

References Cited

UNITED STATES PATENTS 3,299,139  1/1967  Pedersen _____ 260—570.8

OTHER REFERENCES

Burger: "Medicinal Chemistry," 2nd ed., pp. 82–83 (1960).

Protiva et al.: "Journal of Med. Chem.," vol. 4, No. 2, pp. 411–5 (1961).

Beneze: "Chemical Abstracts," vol. 60, pp. 15779–80 (1964).

ROBERT V. HINES, Primary Examiner

U.S. Cl. X.R.

260—326.5 C, 501.18, 501.19, 570.7, 590; 424—274, 330